United States Patent [19]

Garland et al.

[11] Patent Number: 5,079,051
[45] Date of Patent: Jan. 7, 1992

[54] HIGH SHRINK ENERGY/HIGH MODULUS THERMOPLASTIC MULTI-LAYER PACKAGING FILM AND BAGS MADE THEREFROM

[75] Inventors: Steven B. Garland, Simpsonville; Donald J. d'Entremont, Spartanburg, both of S.C.

[73] Assignee: W. R. Grace & Co.-Conn., Duncan, S.C.

[21] Appl. No.: 448,045

[22] Filed: Dec. 8, 1989

[51] Int. Cl.$^5$ .............................. B65B 53/00
[52] U.S. Cl. ........................ 428/34.9; 428/35.4; 428/476.3; 428/483; 428/516; 428/518; 428/520; 156/244.11
[58] Field of Search .............. 428/349, 516, 5, 476.3, 428/474.4, 483, 518, 36.6, 36.7, 34.9; 156/244.11

[56] References Cited

U.S. PATENT DOCUMENTS

| | | | |
|---|---|---|---|
| 3,022,543 | 2/1962 | Baird, Jr. | 18/57 |
| 3,355,319 | 11/1967 | Rees | 117/122 |
| 3,741,253 | 6/1973 | Brax et al. | 138/137 |
| 3,821,182 | 6/1974 | Baird, Jr. | 260/917 |
| 3,845,163 | 10/1974 | Murch | 260/857 |
| 4,048,428 | 9/1977 | Baird, Jr. | 526/343 |
| 4,064,296 | 12/1977 | Bornstein | 428/35 |
| 4,178,220 | 12/1979 | Fowler | 204/159 |
| 4,188,443 | 2/1980 | Mueller | 428/216 |
| 4,194,039 | 3/1980 | Mueller | 428/213 |
| 4,274,900 | 6/1981 | Mueller | 156/229 |
| 4,299,241 | 11/1981 | Seiller | 132/48 |
| 4,457,960 | 7/1984 | Newsome | 428/35 |
| 4,640,856 | 2/1987 | Ferguson | 428/36 |
| 4,732,795 | 3/1988 | Ohya | 428/36 |
| 4,755,402 | 7/1988 | Oberle | 428/35 |
| 4,755,419 | 7/1988 | Shah | 428/220 |
| 4,778,715 | 10/1988 | Ferguson et al. | 428/218 |
| 4,801,486 | 1/1989 | Quacquarella | 428/349 |
| 4,883,693 | 11/1989 | Ohya et al. | 428/34 |
| 4,939,076 | 7/1990 | Mueller | 428/476 |
| 4,977,022 | 12/1990 | Mueller | 428/349 |

FOREIGN PATENT DOCUMENTS 968689  6/1975  Canada ....................... 154/140

Primary Examiner—Edith L. Buffalow
Attorney, Agent, or Firm—William D. Lee, Jr.; Mark B. Quatt; Leigh P. Gregory

[57] ABSTRACT

Disclosed is an oriented, heat-shrinkable, packaging film having a layer of polyamide or polyester. The film has a high shrink energy and high modulus.

12 Claims, No Drawings

HIGH SHRINK ENERGY/HIGH MODULUS THERMOPLASTIC MULTI-LAYER PACKAGING FILM AND BAGS MADE THEREFROM

The invention relates to flexible, thermoplastic, multi-layer, heat-shrinkable (i.e. oriented), packaging films and bags or pouches made therefrom. In particular this invention relates to films and bags having a layer of nylon and/or polyester. Such films and bags exhibit excellent shrink energy properties, and excellent modulus properties. Optionally, the film or bag contains a barrier layer of vinylidene chloride copolymer (PVDC) or ethylene vinyl alcohol copolymer (EVOH).

Heat-shrinkable thermoplastic thermoplastic films are used in packaging of non-food and food products like meat, cheese, poultry and the like. Many attempts have been made to achieve a tight fit of the shrunken film enclosing the food product; however, there is still room for improvement.

BACKGROUND OF THE INVENTION

A film known from U.S. Pat. No. 3,741,253 to Brax comprises a barrier layer of a vinylidene chloride copolymer (saran) between a layer of ethylene-vinyl acetate copolymer and layer of a cross-linked ethylene-vinyl acetate copolymer. Vinylidene chloride copolymers are known barrier materials to fluids such as oxygen. Optionally, the film is oriented. As disclosed in U.S. Pat. No. 4,064,296 to Bornstein the barrier layer may also be a hydrolyzed ethylene-vinyl acetate copolymer (EVOH). It has similar oxygen barrier properties as vinylidene chloride copolymers and offers the advantage that it may be irradiated without discoloration, which is further discussed below. Optionally, the film is oriented.

Blends of linear low density polyethylene and ethylene vinyl acetate copolymer in oriented barrier films are disclosed in U.S. Pat. No. 4,457,960 to Newsome, which claims an oriented multiple layer polymeric film, comprising (a) a first barrier layer, said first layer having two opposing surfaces; (b) a second layer adhered to one said surface, said second layer being 10% to 90% linear low density polyethylene and 90% to 10% ethylene vinyl acetate; and (c) a third layer adhered to the other said surface, the composition of said third layer being selected from the group consisting of (i) ethylene vinyl acetate, and (ii) blends of 10% to 90% linear low density polyethylene with 90% to 10% ethylene vinyl acetate.

U.S. Pat. No. 4,755,402 to Oberle discloses a multi-layer heat-shrinkable (oriented) film comprising a barrier layer of polyvinylidene chloride copolymer and an outer surface abuse layer of polyamide directly adhered to the barrier layer.

U.S. Pat. No. 4,640,856 to Ferguson et al, commonly assigned to W. R. Grace, discloses a three-layer, thermoplastic barrier film of the structure: (a) a layer of very low density polyethylene having a density of less than 0.910 gms/cc; (b) a barrier layer selected from the group consisting of: (1) copolymers of vinylidene chloride and (2) hydrolyzed ethylene-vinyl acetate copolymers; and (c) a thermoplastic polymeric layer, said layer being on the side of the barrier layer opposite to that of layer (a).

It is an object of the present invention to provide a packaging film, preferably a barrier film, and bags made therefrom which have excellent or improved heat shrink characteristics over those of the materials used in the past, such as those of U.S. Pat. No. 4,640,856. This means that the shrink energy (often called shrink tension) and modulus are higher. These properties may be measured in accordance with ASTM D-2838 and ASTM D-882 Method A, respectively. It has been unexpectedly found that by including an interior layer of polyamide or polyester disposed between the sealing layer and another layer of a shrink film, the resultant film will have a higher shrink energy and higher modulus. Polyamide and polyester are stiffer than the ethylene polymers typically used in shrink films. Since stiffer materials are employed, difficulty in stretching during orientation to make the shrink film would be expected. It is an advantage that the stiffness helps keep unsightly purge from accumulating when the films are used in the shrink packaging of meat.

SUMMARY OF THE INVENTION

Therefore, the present invention provides a flexible thermoplastic, multi-layer, heat shrinkable packaging film, said film containing a layer comprising a high shrink energy/high modulus polymer selected from nylon or polyester.

The invention also provides a thermoplastic, multi-layer, heat-shrinkable packaging film having high shrink energy and high modulus properties comprising an abuse polymeric layer, a heat sealing polymeric layer, a core barrier layer, and an interior layer between said sealing and said abuse layers, wherein said interior layer comprises a polymer selected from nylon or polyester.

The invention also provides a process to improve the modulus and shrink energy when manufacturing a flexible, thermoplastic, multi-layer, heat-shrinkable, packaging film, comprising (I) extruding (a) a first thermoplastic polymeric layer, (b) a layer of a polymer selected from polyamide or polyester, and (c) a second thermoplastic polymeric layer; (II) stretch orienting the extruded polymers in at least one direction; and (III) recovering a heat shrinkable polymeric film, the shrink energy and modulus of layer (b) controlling the shrink energy and modulus of the entire multi-layer film. Optionally, the method further includes extruding a barrier layer.

In another aspect the invention also provides side sealed and/or end sealed bags made from the above-mentioned inventive film.

DETAILED DESCRIPTION OF THE INVENTION

The films of the invention preferably have a barrier layer such as a layer of EVOH or saran.

The term "high shrink energy/high modulus" polymer as used herein refers to nylon polymers or polyester polymers, which when formed into the inventive shrink film impart to the film high shrink energy and high modulus. In contrast to a comparison shrink film of the prior art that has been stretch oriented the same amount, for instance 3:1 in the longitudinal direction and 3:1 in the transverse direction, the inventive shrink film will have 10% more shrink energy, more preferably 15% more shrink energy, and most preferably at least 20% more shrink energy, and the inventive shrink film will have a 100% higher modulus, more preferably a 150% higher modulus, most preferably at least a 200% higher modulus. Shrink energy is measured as per ASTM D-2838, and modulus is measured as per ASTM D-882.

Typically, in the manufacture of films, a suitable polymer usually in the form of pellets or the like, is brought into a heated area where the polymer feed is melted and heated to its extrusion temperature and extruded as a tubular "blown bubble" through an annular die. Other methods, such as "slot die" extrusion wherein the resultant extrudate is in planar, as opposed to tubular, form are also well known. If heat shrinkable film is desired, then after extrusion, the film is typically cooled and stretched, i.e. oriented by "tenter framing" or by inflating with a "trapped bubble", to impart the heat-shrinkable property to the film, as is further described below. If desired, irradiation, typically via an electron beam, may take place after but preferably takes place prior to the stretching for orienting the film. However, for the present invention, such irradiation is not necessary since a very suitable packaging film is obtained without irradiation. Below, first is described in detail the general process for making and orienting film. Then irradiation is described in detail.

More particularly, the manufacture of shrink, i.e. oriented, films may be generally accomplished by extrusion (single layer films) or coextrusion (multi-layer films) of thermoplastic resinous materials which have been heated to or above their flow or melting point from an extrusion or coextrusion die in, for example, either tubular or planar (sheet) form, followed by a post extrusion cooling. The stretching for orienting the film may be conducted at some point during the cool down while the film is still hot and at a temperature within its orientation temperature range, followed by completing the cooling. Alternatively, after the post extrusion cooling, the relatively thick "tape" extrudate is then reheated to a temperature within its orientation temperature range and stretched to orient or align the crystallites and/or molecules of the material, and then cooled again. The orientation temperature range for a given material or materials will vary with the different resinous polymers and/or blends thereof which comprise the material. However, the orientation temperature range for a given thermoplastic material may generally be stated to be below the crystalline melting point of the material but above the second order transition temperature (sometimes referred to as the glass transition point) thereof. Within this temperature range, the material may be effectively stretched to provide a heat-shrinkable film.

The terms "orienting" or "oriented" are used herein to describe generally the process steps and resultant product characteristics obtained by stretching, transversely, longitudinally, or both (whether during the post extrusion cool down or during reheating after the post extrusion cool down as described in the paragraph above) and substantially immediately cooling a resinous thermoplastic polymeric material which has been heated to a temperature within its orientation temperature range so as to revise the intermolecular configuration of the material by physical alignment of the crystallites and/or molecules of the material. When the stretching force is applied in one direction, uniaxial orienting results. When the stretching force is applied in two directions, biaxial orienting results. The term oriented is also herein used interchangeably with the term "heat-shrinkable" with these terms designating a material which has been stretched and set by cooling while substantially retaining its stretched dimensions. An oriented (i.e. heat-shrinkable) material will tend to return to it original unstretched (unextended) dimensions when heated to an appropriate elevated temperature.

Returning to the basic process for manufacturing film as discussed above, it can be seen that the film, once extruded (or coextruded if it is a multi-layer film), is then oriented by stretching within its orientation temperature range. The stretching to orient may be accomplished in many ways such as, for example, by "trapped bubble" techniques or "tenter framing". These processes are well known to those in the art and refer to orienting procedures whereby the material is stretched in the cross or transverse direction (TD) and/or in the longitudinal or machine direction (LD). After being stretched, the film is quickly cooled while substantially retaining its stretched dimensions to cool the film rapidly and thus set or lock-in the oriented molecular configuration.

The film which has been made may then be stored in rolls and utilized to package a wide variety of items. If the material was manufactured by "trapped bubble" techniques the material may still be in tubular form or it may have been slit and opened up to form a sheet of film material. In this regard, a product to be packaged may first be enclosed in the material by heat sealing the film to itself where necessary and appropriate to form a pouch or bag and then inserting the product therein. Alternatively, a sheet of the material may be utilized to overwrap the product. These packaging methods are all well known to those of skill in the art.

When a material is of the heat-shrinkable (i.e. oriented) type, then after wrapping, the enclosed product may be subjected to elevated temperatures, for example, by passing the enclosed product through a hot air tunnel or by placing the enclosed product in hot water. This causes the enclosing heat shrinkable film to shrink around the product to produce a tight wrapping that closely conforms to the contour of the product. As stated above, the film sheet or tube may be formed into bags or pouches and thereafter utilized to package a product. In this case, if the film has been formed as a tube it may be preferable first to slit the tubular film to form a film sheet and thereafter form the sheet into bags or pouches. Such bags or pouches forming methods, likewise, are well known to those of skill in the art.

The above general outline for manufacturing of films is not meant to be all inclusive since such processes are well known to those in the art. For example, see U.S. Pat. Nos. 4,274,900; 4,299,241; 4,194,039; 4,188,443; 4,048,428; 3,821,182 and 3,022,543. The disclosures of these patents are generally representative of such processes and are hereby incorporated by reference.

Alternative methods of producing films of this type are known to those in the art. One well-known alternative is the method of forming a multi-layer film by an extrusion coating in combination with an extrusion or coextrusion process as was discussed above. In extrusion coating a first tubular layer or layers is extruded and thereafter an additional layer or layers is simultaneously or sequentially coated onto the outer surface of the first tubular layer or a successive layer. Exemplary of this method is U.S. Pat No. 3,741,253. This patent is generally representative of an extrusion coating process and is hereby incorporated by reference.

Many other process variations for forming films are well known to those in the art. For example, conventional thermoforming or laminating techniques may be employed. For instance, multiple substrate layers may be first coextruded via a blown bubble tube with additional layers thereafter being extrusion coated or laminated thereon, or two multi-layer tubes may be coextruded with one of the tubes thereafter being extrusion coated or laminated onto the other.

In the preferred embodiments as illustrated in the examples below, the multi-layer film of the invention contains a barrier layer. The layer is a barrier to fluids such as gas. The barrier layer may be composed of layer comprising vinylidene chloride copolymer (commonly known as saran), or composed of a layer comprising hydrolyzed ethylene-vinyl acetate copolymer (EVOH), preferably hydrolyzed to at least about 50%, most preferably to greater than about 99%, or composed of both a layer comprising vinylidene chloride copolymer and a layer comprising EVOH. When the barrier layer is composed of a layer comprising EVOH, the mole percent of vinyl acetate prior to hydrolysis should be at least about 29%, since for lesser amounts the effectiveness of the hydrolyzed copolymer as a barrier to fluids such as gas is substantially diminished. It is further preferred that the barrier copolymer have a melt flow being generally compatible with that of the other components of the multi-layer film, preferably in the range of about 3-10 (melt flow being determined generally in accordance with ASTM D1238). The gas of main concern is oxygen and transmission is considered to be sufficiently low, i.e. the barrier material is relatively gas impermeable, when the transmission rate is below 70 $cc/m^2/mil$ thickness/24 hours/atms, as measured according to the procedures of ASTM Method D-1434. The barrier layer of the multi-layer barrier shrink film according to the barrier film embodiment of the present invention has a transmission rate below this value. EVOH can be advantageously utilized in the film of the invention since irradiative high energy electron treatment of the fully coextruded film does not degrade an EVOH barrier layer, as could be the case for a vinylidene chloride copolymer barrier layer.

When, as further discussed below, a vinylidene chloride copolymer (PVDC) is employed instead of or together with EVOH as the barrier layer, then the irradiation preferably should take place prior to application of the saran layer to avoid degradation thereof. The application may be achieved by extrusion coating methods as discussed above. More particularly, the extrusion coating method of film formation is preferable to coextruding the entire film when it is desired to subject one or more layers of the film to a treatment which may be harmful to one or more of the other layers. Exemplary of such a situation is a case where it is desired to irradiate with high energy electrons one or more layers of a film containing a barrier layer comprised of one or more copolymers of vinylidene chloride (i.e. saran), such as of vinylidene chloride and acrylonitrile, of vinylidene chloride and vinyl chloride, of vinylidene chloride and methyl acrylate. In other words, the barrier layer includes a saran layer in addition to or instead of an EVOH layer. Those of skill in the art generally recognize that irradiation with high energy electrons is generally harmful to such saran barrier layer compositions, as irradiation may degrade and discolor saran, making it turn brownish. Thus, if full coextrusion and orientation followed by high energy electron irradiation of the multi-layer structure is carried out on a film having a saran layer, the irradiation should be done at low levels with care. Alternatively, this situation may be avoided by using extrusion coating. Accordingly, one may first extrude or coextrude a first layer or layers, subject that layer or layers to high energy electron irradiation and thereafter extrusion coat the saran barrier layer and, for that matter, simultaneously or sequentially extrusion coat other later layers onto the outer surface of the extruded previously irradiated tube and then orient the resultant. This sequence allows for the irradiative treatment of the first layer or layers without subjecting the PVDC barrier layer to the harmful discoloration effects thereof. Also, with depth control by dose gradient radiation, the outer layer or layers of the entire tube can be post irradiated without subjecting the PVDC to the harmful discoloration. Dose gradient radiation and apparatus therefor are discussed in U.S. Pat. No. 3,780,308 (issued: Dec. 18, 1973), Nable assignor to Energy Sciences, Inc., the disclosure of which is incorporated herein by reference.

Irradiation may be accomplished by the use of high energy electrons, ultra violet radiation, X-rays, gamma rays, beta particles, etc. Preferably, electrons are employed up to about 20 megarads (MR) dosage level. The irradiation source can be any electron beam generator operating in a range of about 150 kilovolts to about 6 megavolts with a power output capable of supplying the desired dosage. The voltage can be adjusted to appropriate levels which may be for example 1,000,000 and 2,000,000 or 3,000,000 or 6,000,000 or higher or lower. Many apparatus for irradiating films are known to those of skill in the art. The irradiation is usually carried out at a dosage up to about 20 MR, typically between about 1 MR and about 20 MR, with a preferred dosage range of about 2 MR to about 12 MR. Irradiation can be carried out conveniently at room temperature, although higher and lower temperatures, for example, 0° C. to 60° C. may be employed.

In addition to the polymer selected from polyamide or polyester, many other polymers are also suitable for use in other layers of the films of the present invention. Suitable other polymers include, but are not limited to, ethylene vinyl acetate (EVA) copolymers; linear low density polyethylene (LLDPE); low density polyethylene (LDPE); high density polyethylene (HDPE); very low density, generally 0.910 g/cc or less, linear low density polyethylene (VLDPE); medium density polyethylene (MDPE); polypropylene (PP); ethylene/propylene copolymers (EPC); ethylene/alkyl-acrylate copolymers (EAA), such as ethylene/methyl-acrylate (EMA); ethylene/ethylacrylate (EEA); and ethylene/butyl-acrylate (EBA); acid modified EVA; copolymers of (i) and (ii) where (i) is an alpha-olefin of the formula $RHC=CH_2$ wherein R is H or $C_1$ to $C_8$ alkyl and (ii) is an alpha,beta-ethylenically unsaturated carboxylic acid; and mixtures thereof. Preferably, in the $RHC=CH_2$ copolymer of an olefin and a carboxylic acid, the olefin is ethylene and the carboxylic acid is acrylic acid or methacrylic acid. Materials, which are the copolmer of an alpha-olefin having the formula $RHC=CH_2$ wherein R is H or $C_1$ to $C_8$ alkyl and an alpha,beta-ethylenically unsaturated carboxylic acid, representatively may be one of the Primacor TM polymers, supplied by Dow Chemical Company, Midland, Mich. Primacor is produced by the free radical copolymerization of ethylene and a carboxylic acid comonomer therefor such as acrylic acid or methacrylic acid. Also, the copolymer of an alpha-olefin having the formula $RHC=CH_2$ wherein R is H or $C_1$ to $C_8$ alkyl and an alpha,beta-ethylenically unsaturated carboxylic acid may be metal salt neutralized such as with sodium, Na. Thus, the copolymer may be an ionomer. Representatively, such an ionomeric material is commercially available as Surlyn RTM from the E. I. du Pont de Nemours Company of Wilmington, Del., and is described in detail in U.S. Pat. Nos. 3,355,319 and 3,845,163. In general, these other polymers are many of the materials described in U.S. Pat. No. 4,801,486, the disclosure of which is incorporated herein by reference.

DEFINITIONS

The terms "saran" or "PVDC", as used herein, refers to a vinylidene chloride copolymer wherein a major amount of the copolymer comprises vinylidene chloride and a minor amount of the copolymer comprises one or more unsaturated monomers copolymerizable therewith. Examples of unsaturated monomers copolymerizable with the vinylidene chloride are vinyl chloride, acrylonitrile, and alkyl acrylates having 1 to 18 carbon atoms in the alkyl group.

As used herein the term "extrusion" or the term "extruding" is intended to include coextrusion, extrusion coating, or combinations thereof, whether by tubular methods, planar methods, or combinations thereof.

An "oriented" or "heat shrinkable" material is defined herein as a material which, when heated to an appropriate temperature above room temperature (for example 96° C.), will have a free shrink of about 5% or greater in at least one linear direction.

Unless specifically set forth and defined or otherwise limited, the terms "polymer" or "polymer resin" as used herein generally include, but are not limited to, homopolymers, copolymers, such as, for example block, graft, random and alternating copolymers, terpolymers, etc. and blends and modifications thereof. Furthermore, unless otherwise specifically limited the term "polymer" or "polymer resin" shall include all possible molecular configurations of the material. These structures include, but are not limited to, isotactic, syndiotactic and random molecular configurations.

The term "nylon" as used herein is intended to be a generic name for all long-chain polyamides which have recurring amide groups (—CO—NH—) as an integral part of the main polymer chain. Nylons are synthesized from intermediates such as dicarboxylic acids, diamines, amino acids and lactams, and are identified by numbers denoting the number of carbon atoms in the polymer chain derived from specific constituents, those from the diamine being given first. The second number, if used, denotes the number of carbon atoms derived from a diacid. For example, in Nylon 6/6 the two numbers refer to the number of carbon atoms in hexamethylenediamine and adipic acid, respectively.

The term "polyester" as used herein is intended to be a general term encompassing all polymers in which the main polymer backbones are formed by the esterification condensation of polyfunctional alcohols and acids. The term "alkyd" was coined from the AL in polyhydric ALcohols and the CID (modified to KYD) in polybasic aCIDs. Hence, in a chemical sense the terms alkyd and polyester are synonymous.

The term "polyethylene" as used herein, which "polyethylene" is employed in the film of the invention, refers to families of resins obtained by substantially polymerizing the gas ethylene, $C_2H_4$. By varying the comonomers, catalysts and methods of polymerization, properties such as density, melt index, crystallinity, degree of branching, molecular weight and molecular weight distribution can be regulated over wide ranges. Further modifications are obtained by other processes, such as halogenation, and compounding additives. Low molecular weight polymers of ethylene are fluids used as lubricants; medium weight polymers are waxes miscible with paraffin; and the high molecular weight polymers are resins generally used in the plastic industry. Polyethylenes having densities ranging from about 0.900 g/cc to about 0.935 g/cc are called low density polyethylenes (LDPE) while those having densities from about 0.935 g/cc to about 0.940 g/cc are called medium density polyethylenes (MDPE), and those having densities from about 0.941 g/cc to about 0.965 g/cc and over are called high density polyethylenes (HDPE). The older, classic low density types of polyethylenes are usually polymerized at high pressures and temperatures whereas the older, classic high density types are usually polymerized at relatively low temperatures and pressures.

The term "linear low density polyethylene" (LLDPE) as used herein, refers to the newer copolymers of a major amount of ethylene with a minor amount of one or more comonomers selected form $C_3$ to about $C_{10}$ or higher alpha-olefins such as butene-1, pentene-1, hexene-1, octene-1, etc. in which the molecules thereof comprise long chains with few side chains or branched structures achieved by low pressure polymerization. The side branching which is present will be short as compared to non-linear polyethylenes. The molecular chains of a linear polymer may be intertwined, but the forces tending to hold the molecules together are physical rather than chemical and thus may be weakened by energy applied in the form of heat. Linear low density polyethylene has a density preferably in the range from about 0.911 g/cc to about 0.935 g/cc, more preferably in the range of from about 0.912 g/cc to about 0.928 g/cc for film making purposes. The melt flow index of linear low density polyethylene generally ranges from between about 0.1 to about 10 grams per ten minutes and preferably between from about 0.5 to about 3.0 grams per ten minutes. LLDPE resins of this type are commercially available and are manufactured in low pressure vapor phase and liquid phase processes using transition metal catalysts. The very low density linear low density polyethylenes (VLDPE) have a density from about 0.910 g/cc to about 0.860 g/cc, or even lower.

The term "ethylene vinyl acetate copolymer" (EVA) as used herein refers to a copolymer formed from ethylene and vinyl acetate monomers wherein the ethylene derived units in the copolymer are present in major amounts and the vinyl acetate (VA) derived units in the copolymer are present in minor amounts. For film forming purposes, it is desirable that the VA content of the EVA be from about 3% to about 25%.

The term "ethylene/alkyl-acrylate copolymer" (EAA) as used herein refers to a copolymer formed from ethylene and alkyl acrylate wherein the alkyl moiety has 1 to 8 carbon atoms and the ethylene derived units in the copolymer are present in major amounts and the alkyl-acrylate derived units in the copolymer are present in minor amounts. Thus, the term "ethylene/methyl acrylate copolymer" (EMA) as used herein for a type of polyethylene, refers to a copolymer formed from ethylene and methyl acrylate monomers. The term "ethylene/ethyl acrylate copolymer" (EEA) as used herein for a type of polyethylene, refers to a copolymer formed from ethylene and ethyl acrylate monomers. The term "ethylene/butyl acrylate copolymer" (EBA)

as used herein for a type of polyethylene, refers to a copolymer formed from ethylene and butyl acrylate monomers. Many suitable EBA's are commercially available and these have a butyl acrylate content from about 3% up to about 18% by weight. USI is a commercial supplier of Resin NPE 4771, which is an EBA having about 5% by weight butyl acrylate and a melt index of 3 and a melting point of about 105° to 106° C.

The following Examples are intended to illustrate the preferred embodiments of the invention and comparisons thereto. It is not intended to limit the invention thereby.

MATERIALS EMPLOYED IN THE EXAMPLES

A suitable adhesive type of polymer that was employed in the films of the invention is commercially available as Bynel CXA 3101. It is an ethylene-based adhesive with a combination of ester and acid comonomer functionally, (i.e. an acid-modified EVA) and is supplied by du Pont. It is about 20% acid and about 80% EVA (23% VA).

The LLDPE employed in the examples was Dowlex 2045.03 having a melt index of 1.1 and a density of 0.920. It was supplied by Dow Chemical. The comonomer is octene.

USI was the commercial supplier of Resin No. NA-295-00, which is some of the EVA employed in the laboratory examples. It contains 6% vinyl acetate and has a melt index of 2.6.

One polyester employed in the Examples was polyethylene terephthalate (hereinafter PET) sold under the tradename Kodapak 9921 by Eastman Kodak. Another was polyethylene terephthalate, glycol derivative (hereinafter PETG) sold under the tradename 6763 by Eastman Kodak.

The Saran (denoted in the examples below as Saran-MA) employed in the laboratory examples was MA-127, supplied by Dow Chemical. It is a copolymer of vinylidene chloride with methyl acrylate.

Some of the EVA employed in the laboratory examples was LD318.92, which is an EVA containing 9% vinyl acetate and having a melt index of 2.0. It was supplied by Exxon.

EXAMPLES

Percentages indicated in the Examples were calculated as % by weight.

In the Examples below the multi-layer films were made by combining tubular coextrusion (colloquially called the hot blown bubble technique) with extrusion coating to achieve an oriented (heat-shrinkable) film. A tubular process was utilized wherein a coextruded tube of a multi-layer substrate was extrusion coated with saran and one or more other layers simultaneously, then the resultant structure was cooled and collapsed, and then reheated and biaxially stretched in the transverse direction (TD) and in the longitudinal machine direction (LD) via inflating the tube with a bubble. Sometimes 2 layers are extrusion coated; sometimes 3 layers are extrusion coated. The modified die allows for extrusion coating up to 3 layers. Then the stretched bubble was cooled and collapsed, and the deflated oriented film wound up as flattened, seamless, tubular film to used later to made bags, overwrap et cetera. The after-orientation total thickness was about 2.2 to 2.5 mils. Prior to the coating of the saran layer and the additional layer(s), the substrate was guided through an ionizing radiation field; for example, through the beam of an electron accelerator to receive a radiation dosage in the range of about 4.5 megarads (MR).

More particularly, the films were made by first hot blowing through an annular die a 4-layer extruded tube of the structure: LAYER 1/LAYER 2/LAYER 3/LAYER 4 as the substrate. Then with a multi-ply die, a layer of saran (barrier layer 5) and another layer (outside layer 6) were extrusion coated on. The resultant 6-layer structure was then cooled and collapsed. The tube was then reheated and oriented by stretching via a trapped bubble 3:1 in the transverse direction and 3:1 in the longitudinal direction for an overall biaxial orientation of 9:1. When such films were made into bags, the heat sealing layer 1 was the "inner" or "inside" layer as it was the bag "inside", and "outside" layer 6 was the abuse layer of the bag "outside". When 3 layers are extrusion coated, then the resultant has 7 layers, with "outside" layer 7 as the abuse layer of the bag "outside".

The substrate was irradiated at 4.5 MR prior to the extrusion coating. As noted in the Tables below, the modulus and shrink energy were measured in accordance with procedures set out in ASTM D-882 and ASTM D-2838, respectively.

EXAMPLE I

A 6-layer film was made as described above so that the film from heat sealing layer 1 to abuse layer 6 of the following structure: 90 % EVA (6% VA)+10% LLDPE/Adhesive/PETG/Adhesive/Saran-MA/91% EVA (9% VA)+9% LLDPE.

EXAMPLE II

A 6-layer film was made as described above, very similar to that of Example I, but PET was used instead of PETG so that the film from heat sealing layer 1 to abuse layer 6 was of the following structure: 90% EVA (6% VA)+10% LLDPE/Adhesive/PET/Adhesive/Saran-MA/ 91% EVA (9% VA)+9% LLDPE.

EXAMPLE III

A 7-layer film is made as described above, very similar to that of Example I, except three layers instead of two are extrusion coated on, so that the film from heat sealing layer 1 to abuse layer 7 is of the following structure: 90% EVA (6% VA)+10% LLDPE/Adhesive/PETG/Adhesive/Saran-MA/91% EVA (9% VA)+9% LLDPE/91% EVA (9% VA)+9% LLDPE.

EXAMPLE IV

A 7-layer film is made as described above, very similar to that of Example II, except three layers are extrusion coated on instead of two, so that the film from heat sealing layer 1 to abuse layer 7 is of the following structure: 90% EVA (6% VA)+10% LLDPE/Adhesive/PET/Adhesive/Saran-MA/91% EVA (9% VA)+9% LLDPE/91% EVA (9% VA)+9% LLDPE.

EXAMPLE V

A 5-layer film is made as described above, very similar to that of Example II, except that the substrate has 2 layers, and 3 layers are extrusion coated, so that the film from heat sealing layer 1 to abuse layer 5 is of the following structure:

90% EVA (6% VA)+10% LLDPE/Adhesive/Saran-MA/Adhesive/PET

COMPARISON EXAMPLES

Comparison films were made as described above, and no PETG nor any PET was used. The films were of the following structures from heat sealing layer 1 to abuse layer 4.

Comparison film A was of the structure: 10% LLDPE+90% EVA (6%VA)/EVA/Saran-MA/91% LLDPE+9% EVA (9% VA).

Comparison film B was of the structure: 10% LLDPE+90% EVA (6% VA)/93% LLDPE+7% adhesive/Saran-MA/9% LLDPE+91% EVA (9% VA).

Comparison film C was of the structure: 10% LLDPE+90% EVA (6% VA)/85% LLDPE+15% EBA/Saran-MA/84% HDPE +16% EVA (9% VA).

The shrink energy and modulus of the film Example II was compared with that of comparison films A, B, C as summarized in the table below.

| Sample | SHRINK ENERGY (Pounds/Sq. In) | | MODULUS 1000 Pounds/Sq. In. | |
|---|---|---|---|---|
| | LD | TD | LD | TD |
| Comparison A | 220 | 350 | 36 | 34 |
| Comparison B | 250 | 420 | 32 | 37 |
| Comparison C | 250 | 420 | 35 | 36 |
| Example II | 315 | 580 | 134 | 165 |

Clearly, it can be seen that the film of the invention, namely Example II, has a much higher shrink energy and modulus than any of the prior art films A, B, or C.

We claim:

1. A multilayer, flexible, thermoplastic heat-shrinkable, high shrink energy/high modulus, packaging film comprising:
   (a) an interior layer, the composition of said interior layer being selected from the group consisting of polyamide or polyester;
   (b) a thermoplastic heat sealing layer disposed on one side of the interior layer (a);
   (c) a barrier layer comprising a barrier material selected from the group consisting of: (1) copolymers of vinylidene chloride and (2) hydrolyzed ethylene-vinyl acetate copolymers, said barrier layer disposed on the side of interior layer (a) opposite to that of thermoplastic heat sealing layer (b);
   (d) another thermoplastic polymer layer, said other thermoplastic layer being on the side of the barrier layer opposite to that of the interior layer (a);
   (e) the shrink energy and modulus of layer (a) controlling the shrink energy and modulus of the entire multilayer barrier film; and
   (f) wherein at least one layer is a substrate upon which subsequent layers have been extrusion coated.

2. The film of claim 1 wherein the other thermoplastic polymer of layer (d) comprises a material selected from ethylene polymers and copolymers.

3. The film of claim 1 wherein layer (d) comprises a polymer selected from the group of ethylene-vinyl acetate copolymer, an ethylene alkyl acrylate copolymer, very low density linear polyethylene, linear low density polyethylene, low density polyethylene, medium density polyethylene, high density polyethylene, copolymers of (i) and (ii) where (i) is an alpha-olefin of the formula $RHC=CH_2$ wherein R is H or $C_1$ to $C_8$ alkyl and (ii) is an alpha-beta-ethylenically unsaturated carboxylic acid, polypropylene, ethylene-propylene copolymer, ionomer or a mixture thereof.

4. The film of claim 1 wherein said film is in the form of a seamless tube with heat sealing layer (b) being on the inside of the tube wall.

5. A bag formed from tubular film according to claim 4 wherein the bottom of the bag is formed by a transverse seal across the flattened tube with the mouth of the bag at a preselected distance from said transverse seal.

6. The multi-layer film of claim 1 wherein an adhesive layer is interposed between the barrier layer and the layer (b).

7. The multi-layer film of claim 6 wherein said film comprises five layers in which the barrier layer (c) is a core layer, at least one layer on one side of the barrier layer comprises an adhesive, and at least one of layers (a) or (d) is a surface layer of very low density polyethylene.

8. The film of claim 1 wherein the film has been formed by coextrusion.

9. A side-sealed bag formed from the film of claim 1, said film being folded so that the fold forms the bottom of the bag and side seals close the side of the bag.

10. A process for improving the shrink energy and modulus when manufacturing flexible thermoplastic, multilayer, heat-shrinkable packaging film comprising (I) coextruding at least (a) a first thermoplastic polymeric layer, and (b) a layer of a polymer selected from polyamide or polyester to form a substrate; (II) extrusion coating at least a barrier layer onto said substrates to form a tape; (III) stretch orienting the tape in at least one direction; and (IV) recovering a heat-shrinkable polymeric film, the shrink energy and modulus of layer (b) controlling the shrink energy and modulus of the entire multilayer film.

11. The multilayer film of claim 1, wherein said at least one layer comprising said substrate has been irradiated prior to subsequent extrusion coating.

12. A multilayer, flexible, thermoplastic heat-shrinkable, high shrink energy/high modulus, packaging film, comprising:
   (a) an interior layer comprising a polyester;
   (b) a thermoplastic heat sealing layer disposed one one side of the interior layer (a);
   (c) a barrier layer comprising hydrolyzed ethylene-vinyl acetate copolymers, said barrier layer disposed on the side of the interior layer (a) opposite to that of thermoplastic heat sealing layer (b);
   (d) another thermoplastic polymeric layer, said other thermoplastic layer being on the side of the barrier layer opposite to that of the interior layer (a); and
   (e) the shrink energy and modulus of layer (a) controlling the shrink energy and modulus of the entire multilayer barrier film.

* * * * *